(12) United States Patent
Bin Sediq

(10) Patent No.: US 12,414,092 B2
(45) Date of Patent: Sep. 9, 2025

(54) LOAD-AWARE VARIABLE PERIODIC RESOURCE ALLOCATION

(71) Applicant: Telefonaktiebolaget LM Ericsson (publ), Stockholm (SE)

(72) Inventor: Akram Bin Sediq, Kanata (CA)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 476 days.

(21) Appl. No.: 17/921,186

(22) PCT Filed: May 26, 2020

(86) PCT No.: PCT/IB2020/054986
§ 371 (c)(1),
(2) Date: Oct. 25, 2022

(87) PCT Pub. No.: WO2021/240212
PCT Pub. Date: Dec. 2, 2021

(65) Prior Publication Data
US 2023/0180196 A1    Jun. 8, 2023

(51) Int. Cl.
*H04W 72/04* (2023.01)
*H04W 72/0446* (2023.01)
*H04W 72/52* (2023.01)

(52) U.S. Cl.
CPC ....... *H04W 72/0446* (2013.01); *H04W 72/52* (2023.01)

(58) Field of Classification Search
CPC ............. H04W 72/14; H04W 72/0446; H04W 72/1268; H04W 72/1284; H04W 52/0216;
(Continued)

(56) References Cited

U.S. PATENT DOCUMENTS 10,536,959 B2  1/2020  Barabell et al.
10,660,115 B1  5/2020  Marupaduga et al.
(Continued)

FOREIGN PATENT DOCUMENTS

CN  105162549 A  12/2015
CN  110225594 A  9/2019
KR  20120000482 A  1/2012

OTHER PUBLICATIONS

Chinese Office Action dated Dec. 10, 2024 and English summary translation of the Chinese Office Action issued in corresponding Chinese Patent Application No. 202080101381.6, consisting of 7 pages.
(Continued)

*Primary Examiner* — Wei Zhao
(74) *Attorney, Agent, or Firm* — Weisberg I.P. Law, P.A.

(57) ABSTRACT

A method for a network node for adjusting a periodicity of periodic resources allocated to a wireless device (WD) in a wireless network. The periodicity defines a period of time between periodic resources allocated to the WD. A periodic resource is allocated to the WD to be used by the WD to transmit data to the network node, where the allocation is based at least in part on a periodicity. The method includes determining whether the allocation of the periodic resource to the WD is one of successful and not successful based on whether there is an available resource having the periodicity of the periodic resource. The periodicity of periodic resources is adjusted based on whether or not the allocation of the periodic resource to the WD is successful.

22 Claims, 3 Drawing Sheets

(58) Field of Classification Search
CPC . H04W 52/0229; H04W 88/04; H04W 72/52; H04W 72/126
See application file for complete search history.

(56) References Cited

U.S. PATENT DOCUMENTS

| | | | |
|---|---|---|---|
| 11,071,172 B2* | 7/2021 | He | H04W 52/0251 |
| 2015/0098406 A1 | 4/2015 | Miao et al. | |
| 2016/0112977 A1* | 4/2016 | Byun | H04W 72/541 370/350 |
| 2017/0013492 A1 | 1/2017 | Marinier et al. | |
| 2017/0019914 A1* | 1/2017 | Rune | H04W 72/1268 |
| 2019/0364541 A1 | 11/2019 | Ryu | |

OTHER PUBLICATIONS

3GPP TSG RAN WG1 Meeting #88; R1-1702142; Source: Intel Corporation; Title: Details of congestion control for V2V communication; Agenda item: 7.2.1.3; Document for: Discussion and Decision; Athens, Greece Feb. 13-17, 2017, consisting of 7 pages.

International Search Report and Written Opinion dated Feb. 23, 2021 issued in PCT Application No. PCT/IB2020/054986, consisting of 14 pages.

3GPP TS 36.213 V15.1.0 (Mar. 2018) 3rd Generation Partnership Project; Technical Specification Group Radio Access Network; Evolved Universal Terrestrial Radio Access (E-UTRA); Physical Layer Procedures (Release 15), consisting of 499 pages.

R. A. Delgado et al., Fast Convergence Outer Loop Link Adaptation with Infrequent Updates in Steady State, 2017 IEEE 86th Vehicular Technology Conference (VTC-Fall), Toronto, ON, 2017, consisting of 5 pages.

K. I. Pedersen et al., Frequency Domain Scheduling for OFDMA with Limited and Noisy Channel Feedback, 2007 IEEE 66th Vehicular Technology Conference, Baltimore, MD, 2007, consisting of 5 pages.

A. Sampath et al., On Setting Reverse Link Target SIR in a CDMA System, 1997 IEEE 47th Vehicular Technology Conference, Technology in Motion, Phoenix, AZ, USA, 1997, pp. 929-933 vol.2, consisting of 5 pages.

Indian Office Action dated Mar. 11, 2025 issued in corresponding Indian Application No. 202247074205, consisting of 6 pages.

* cited by examiner

LOAD-AWARE VARIABLE PERIODIC RESOURCE ALLOCATION

CROSS-REFERENCE TO RELATED APPLICATION

This application is a Submission Under 35 U.S.C. § 371 for U.S. National Stage Patent Application of International Application Number: PCT/IB2020/054986, filed May 26, 2020 entitled "LOAD-AWARE VARIABLE PERIODIC RESOURCE ALLOCATION," the entirety of which is incorporated herein by reference.

TECHNICAL FIELD

Wireless communication networks and more particularly to methods and apparatuses for periodic resource allocation that is load aware.

BACKGROUND

Wireless communication networks, such as those provided based on standards promulgated by the 3$^{rd}$ Generation Partnership Project (3GPP), e.g., Long Term Evolution (LTE) and New Radio (NR) (NR is also referred to as 5G), support at least a network node and more than one wireless device (WD). In these environments, the management of the periodicity of radio resources assigned to the WDs by the network node may be useful in order to minimize latency or even maximize the benefits received by the WDs.

Generally, several considerations are made when a network node assigns periodic resources to WDs in a cell. Some of these considerations include that a WD receives a benefit when a resource is assigned to the WD, and that WDs arrive at the cell with an arrival rate that is unknown to the network node.

In addition, the number of resources in a network node is dependent on the periodicity of each of the resources. Higher periodicity implies less resources and vice versa. More precisely, one resource of periodicity p can be decomposed into n resources, where n is an integer, each with a periodicity of n*p. For example, a resource of periodicity 2 can be decomposed into two resources each with periodicity equal to 4, or a resource of periodicity equal to 5 can be decomposed in two resources each with periodicity equal to 10.

Although a network node may have a mixture of resources with different periodicities, a WD can be assigned at most one resource. In addition, the network node can assign and/or de-assign the resource to the WD at any time the WD is active. However, there is a cost for assigning and de-assigning resources. For example, changing the periodicity of a resource that is already assigned to a WD may require a cost that is equal to the cost of assigning a resource. Another consideration is that a WD may enter a cell and may stay active for a period of time that is unknown to the network node. After this period, the WD may exit the cell and return an assigned resource.

By assigning a resource to a WD, a network node receives a benefit greater than or equal to 0. The benefit received by the network node may be governed at least by the following attributes: (1) the WD benefit is a non-increasing function of the periodicity of resources, i.e., for resource 1 with periodicity p1 and resource 2 with periodicity p2, where p1>p2, then the benefit received by any WD from resource 1 is less or equal to the benefit received from resource 2 since resource 1 has higher periodicity; (2) for a given WD, the benefit is dependent on the resource periodicity, i.e., all resources with the same periodicity results in the same benefit to WD; (3) for a given resource, the benefit of assigning the resource to WD$_i$ is the same as assigning the resource to WD$_j$, for all i, j; (4) the benefit of a resource to a WD is a non-decreasing function of the time the WD is assigned the resource, and the benefit is by definition 0 when the WD is not assigned a resource for the entire active period; and (5) the network node benefit is the total benefits received by WD.

A goal of the network node is to allocate limited resources to maximize long-term average benefits of the network node, which are defined as the sum of all benefits received by WD's divided by a time window (T), as T goes to infinity.

In LTE and NR wireless systems, the network node usually determines whether a WD may require a periodic resource in the cell where the WD is connected. This determination usually happens when the WD first connects to the cell and it is deemed beneficial or necessary by the network node to assign the WD such a resource. In some other cases, the determination happens when WD moves from out-of-sync status to in-sync status. Other events can also trigger the determination, such as handover, change of WD's requirements or channel conditions, change of user transmission mode, or any other trigger.

Periodic resources that are used in LTE and NR include physical uplink control channel (PUCCH) scheduling request (SR) resources, PUCCH Channel Quality Indicator (CQI), and periodic sounding reference signals (SRS). A PUCCH SR resource is used by the WD to make a scheduling request to the network node so the network node can allocate an uplink (UL) grant to the WD, and the WD can transmit uplink data. Each allocation or deallocation of periodic SR resources involves radio resource control (RRC) reconfiguration signaling, which the network node tries to minimize. The periodicity of the PUCCH SR resource is chosen by the network node, considering the WD's capability, to strike a balance between latency and number of PUCCH SR resources. Choosing a higher periodicity results in higher latency, as the WD needs to wait longer until the WD can transmit an SR, but higher periodicity also results in more PUCCH SR resources, which helps in supporting more WD's in the cell. Conversely, choosing a lower periodicity results in lower latency, but a lower periodicity also results in less PUCCH SR resources, which reduces the number of WD's that can be supported in the cell. In frequency division duplex (FDD) LTE, for instance, the WD-specific periodicity for subframe-based SR can be 1, 2, 5, 10, 20, 40, or 80 msec.

A PUCCH CQI resource is used by the WD to report periodically channel state information (CSI) which can include CQI, precoding matrix indicator (PMI), and rank indicator (RI). Each allocation or deallocation of periodic PUCCH CQI resources involves RRC signaling, which the network node tries to minimize. The periodicity of a PUCCH CQI resource is chosen by the network node, considering the WD's capability, to strike a balance between accurate CSI and number of PUCCH CQI resources. Choosing a higher periodicity results in dated CSI measurement, as the WD needs to report CSI less often, which may not be suitable for time-varying channels, but higher periodicity also results in more PUCCH CQI resources, which helps in supporting more WD's in the cell. Conversely, choosing a lower periodicity results in more up-to-date CSI measurement, but a lower periodicity also results in less PUCCH CQI resources, which reduces the number of WD's that can be supported in the cell. In FDD LTE for instance, the WD-specific periodicity in the general case for wideband CQI/PMI reporting can be 2, 5, 10, 20, 32, 40, 60, 64, 80, 128, or 160 msec.

A periodic SRS resource is used by the WD to transmit sounding reference signal which allows the network node to obtain more accurate knowledge of the uplink channel. If downlink-uplink reciprocity holds, as in time-division-duplexing (TDD) scenarios, the network node can estimate the downlink channel as well. Such accurate estimation of the channel allows the network node to serve the WD's better by designing better beamforming and improving link adaptations and power control, which can lead to higher throughputs for such WD's. Each allocation or deallocation of periodic SRS resources involves RRC reconfiguration signaling, which the network node tries to minimize. The periodicity of SRS resource is chosen by the network node, considering the WD's capability, to strike a balance between accurate channel estimation and number of SRS resources. Choosing a higher periodicity results in dated channel estimation measurement, as the WD needs to report channel quality information less often, which may not be suitable for time-varying channels. However, higher periodicity also results in more SRS resources, which helps in supporting more WD's in the cell with SRS. Conversely, choosing a lower periodicity results in more up-to-date channel measurement, but lower periodicity also results in less SRS resources, which reduces the number of WD's that can be supported in the cell with SRS. In FDD LTE for instance, the WD-specific periodicity in the general case can be 2, 5, 10, 20, 40, 80, 160, or 320 msec.

In the applications described above, a further optimization can be made in allocating the resources by differentiating the WD's depending on their traffic and channel conditions. For instance, a high-speed WD whose channel is changing rapidly would likely benefit more by being assigned PUCCH CQI or SRS resources with lower periodicity compared to a stationary WD whose channel is changing slowly. Moreover, a WD with larger downlink traffic download will likely benefit from assigning SRS than a WD with light downlink traffic. In this disclosure, it is assumed that the benefit from a given resource with a given periodicity is the same regardless of the WD that receives it. This helps in designing a solution that is a more simple, practical, and robust scheme while achieving good performance that adapts to WD load in the system.

In practice, since the WD load is time varying, the periodicity of periodic resources in cellular system are static parameters that are hard to configure or change according to the WD load. This leads to having the periodicity of resources be over-provisioned to accommodate the maximum number of WDs that can be connected to a cell. This is not efficient at least because having static parameters does not allow to exploit the time-varying nature of the WD load.

SUMMARY

Some embodiments advantageously provide methods and apparatuses for periodic resource allocation that is load aware.

According to one aspect of the present disclosure, a method for a network node for adjusting a periodicity of periodic resources allocated to a WD in a wireless network is provided. The periodicity defines a period of time between periodic resources allocated to the WD. A periodic resource to the WD to be used by the WD to transmit data to the network node is allocated. The allocation is based at least in part on a periodicity. The method also includes determining whether the allocation of the periodic resource to the WD is one of successful and not successful based on whether there is an available resource having the periodicity of the periodic resource. The periodicity of periodic resources is adjusted based on whether or not the allocation of the periodic resource to the WD is successful.

In some embodiments of this aspect, adjusting the periodicity is further based on an output generated by one of an integral controller and proportional-integral-derivative (PID) controller. In other embodiments of this aspect, adjusting the periodicity further includes determining upStep as an amount of increase in the periodicity, given by $$upStep = \frac{1 - maxBlockProb}{maxBlockProb} \times downStep,$$

where downStep is a configurable parameter denoting an amount of decrease in periodicity, and maxBlockProb is a configurable parameter that denotes a maximum blocking probability of the WD requiring an unavailable periodic resource.

In some embodiments of this aspect, adjusting the periodicity further includes decrementing the periodicity by an amount equal to downStep if the allocation of the periodic resource to the WD is successful, and incrementing the periodicity by an amount equal to upStep if the allocation of the periodic resource to the WD is not successful. In some embodiments of this aspect, adjusting the periodicity is further based on a type of periodic resource being allocated by the network node.

In some embodiments of this aspect, adjusting the periodicity further includes updating the periodicity so that the periodicity is within a configurable range. In other embodiments of this aspect, adjusting the periodicity is further based on one of a plurality of predefined classes of WD users.

In some embodiments of this aspect, the method further includes determining that periodic resources are unavailable to be allocated to the WD. A plurality of WDs having allocated periodic resources is identified. A periodicity is obtained for each of the identified WDs of the plurality of WDs to determine a new periodicity, $p_{new}$, to be assigned to the WD and each of the identified WDs, $p_{new}$ being expressed as:

$$p_{new} = f\left(\frac{n+1}{\sum_{i=1}^{n} \frac{1}{p_i}}\right),$$

where f is a function that rounds up to a next supported periodicity, n is a total number of identified WDs with allocated periodic resources, i is an index of summation for an identified WDs of the identified WDs, and $p_i$ is the periodicity of the identified WD. The method further includes, optionally, assigning periodicity, $p_{new}$, to the WD and each of the identified WDs.

In some embodiments of this aspect, identifying a WD for inclusion in the plurality of WDs is based at least in part on predefined criteria including one of a priority of the WD, an activity of a WD on the wireless network, periodicity of a WD, and a periodicity benefit of the WD. In some other embodiments of this aspect, allocating a periodic resource is initiated when a need to allocate the periodic resource to the WD is determined. In some embodiments, the periodic resource is one of a physical uplink control channel, PUCCH, scheduling request, SR, resource, a PUCCH channel quality indicator, CQI, resource, and a periodic sounding reference signal, SRS, the periodic resource being used in one of Long Term Evolution, LTE, and New Radio, NR.

According to another aspect of the present disclosure, a network node is configured to adjust a periodicity of periodic resources allocated to a WD in a wireless network. The periodicity defines a period of time between periodic resources allocated to the WD. The network node includes processing circuitry. The processing circuitry has a processor and a memory. The processing circuitry is configured to allocate a periodic resource to the WD to be used by the WD to transmit data to the network node. The allocation is based at least in part on a periodicity. The processing circuitry is further configured to determine whether the allocation of the periodic resource to the WD is one of successful and not successful based on whether there is an available resource having the periodicity of the periodic resource. The processing circuit is further configured to adjust the periodicity of periodic resources based on whether or not the allocation of the periodic resource to the WD is successful.

In some embodiments of this aspect, adjusting the periodicity is further based on an output generated by one of an integral controller and proportional-integral-derivative (PID) controller. In some embodiments of this aspect, adjusting the periodicity further includes determining upStep as an amount of increase in the periodicity, given by $$upStep = \frac{1 - maxBlockProb}{maxBlockProb} \times downStep,$$

where downStep is a configurable parameter denoting an amount of decrease in periodicity, and maxBlockProb is a configurable parameter that denotes a maximum blocking probability of the WD requiring an unavailable periodic resource.

In some embodiments of this aspect, adjusting the periodicity further includes decrementing the periodicity by an amount equal to downStep if the allocation of the periodic resource to the WD is successful, and incrementing the periodicity by an amount equal to upStep if the allocation of the periodic resource to the WD is not successful. In some other embodiments of this aspect, adjusting the periodicity is further based on a type of periodic resource being allocated by the network node.

In some embodiments of this aspect, adjusting the periodicity further includes updating the periodicity so that the periodicity is within a configurable range. In other embodiments of this aspect, adjusting the periodicity is further based on one of a plurality of predefined classes of WD users.

In some embodiments of this aspect, the processing circuitry is further configured to determine that periodic resources are unavailable to be allocated to the WD and to identify a plurality of WDs having allocated periodic resources. The processing circuitry is further configured to obtain a periodicity for each of the identified WDs of the plurality of WDs to determine a new periodicity, $p_{new}$, to be assigned to the WD and each of the identified WDs, $p_{new}$ being expressed as:

$$p_{new} = f\left(\frac{n+1}{\sum_{i=1}^{n} \frac{1}{p_i}}\right),$$

where f is a function that rounds up to a next supported periodicity, n is a total number of identified WDs with allocated periodic resources, i is an index of summation for an identified WDs of the identified WDs, and $p_i$ is the periodicity of the identified WD. The processing circuitry is further configured to, optionally, assign periodicity, $p_{new}$, to the WD and each of the identified WDs.

In some embodiments of this aspect, identifying a WD for inclusion in the plurality of WDs is based at least in part on predefined criteria including one of a priority of the WD, an activity of a WD on the wireless network, periodicity of a WD, and a periodicity benefit of the WD. In some embodiments of this aspect allocating a periodic resource is initiated when a need to allocate the periodic resource to the WD is determined.

In some embodiments of this aspect, the periodic resource is one of a physical uplink control channel, PUCCH, scheduling request, SR, resource, a PUCCH channel quality indicator, CQI, resource, and a periodic sounding reference signal, SRS, the periodic resource being usable in one of Long Term Evolution, LTE, and New Radio, NR.

BRIEF DESCRIPTION OF THE DRAWINGS

A more complete understanding of the present embodiments, and the attendant advantages and features thereof, will be more readily understood by reference to the following detailed description when considered in conjunction with the accompanying drawings wherein.

DETAILED DESCRIPTION

Figure 1:
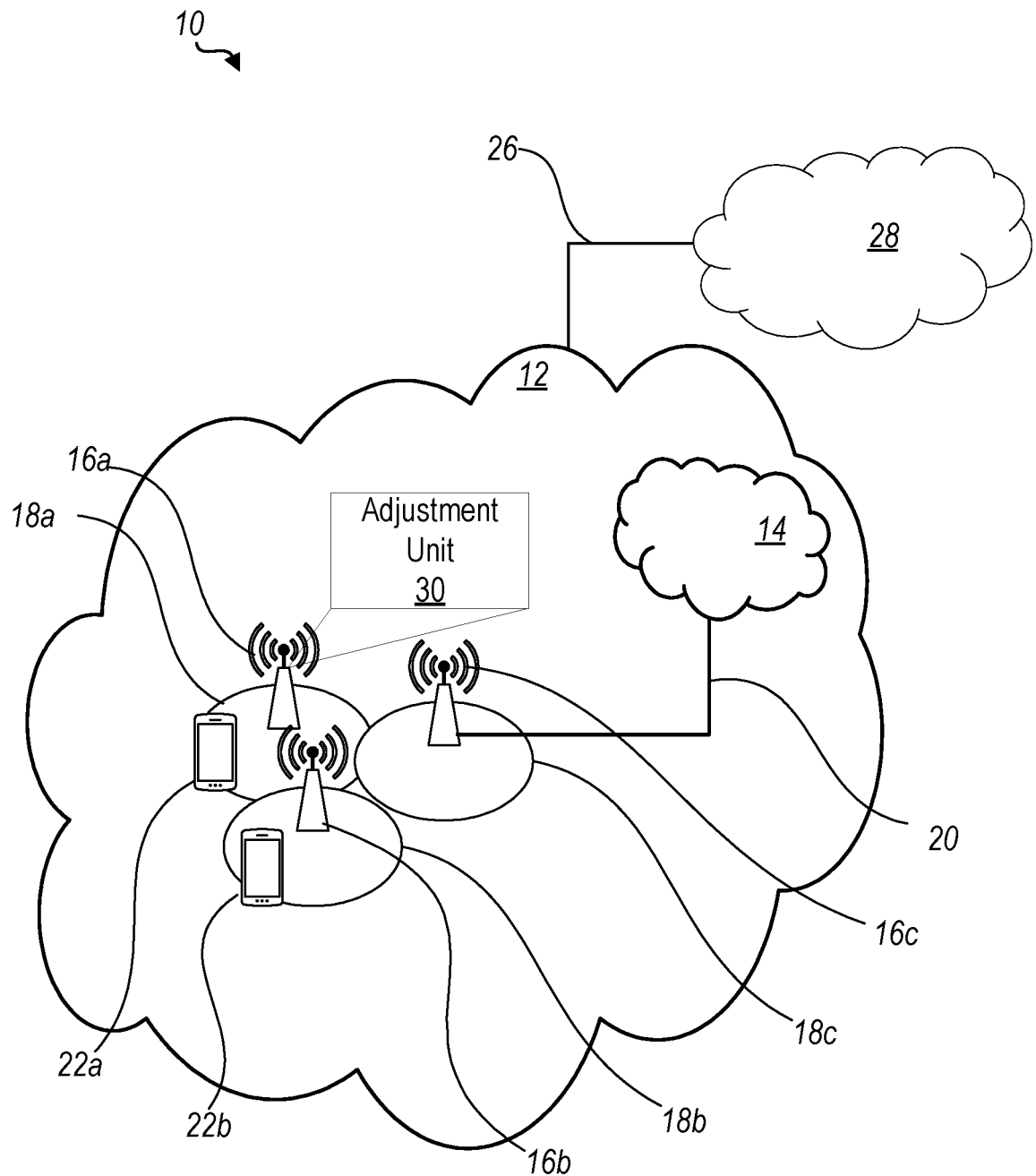
FIG. 1 is a schematic diagram of an example network architecture illustrating a communication system according to the principles in the present disclosure.

Some embodiments of the present disclosure provide methods and arrangements that control periodicity of resources to be assigned to a user at a cell level. In some embodiments, the periodicity is dynamically adjusted such that a blocking probability, defined herein as the probability of a WD requiring a periodic resource when there is no resource available, is below a pre-configured threshold. Other embodiments of the present disclosure provide methods and arrangements to control the periodicity of periodic resources to advantageously improve performance as compared with known arrangements and exploit the time-varying nature of user load in a cell.

Before describing in detail exemplary embodiments, it is noted that the embodiments reside primarily in combinations of apparatus components and processing steps related to periodic resource allocation that is load aware Accordingly, components have been represented where appropriate by conventional symbols in the drawings, showing only those specific details that are pertinent to understanding the embodiments so as not to obscure the disclosure with details that will be readily apparent to those of ordinary skill in the art having the benefit of the description herein. Like numbers refer to like elements throughout the description.

As used herein, relational terms, such as "first" and "second," "top" and "bottom," and the like, may be used solely to distinguish one entity or element from another entity or element without necessarily requiring or implying any physical or logical relationship or order between such entities or elements. The terminology used herein is for the purpose of describing particular embodiments only and is not intended to be limiting of the concepts described herein. As used herein, the singular forms "a", "an" and "the" are intended to include the plural forms as well, unless the context clearly indicates otherwise. It will be further understood that the terms "comprises," "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

In embodiments described herein, the joining term, "in communication with" and the like, may be used to indicate electrical or data communication, which may be accomplished by physical contact, induction, electromagnetic radiation, radio signaling, infrared signaling or optical signaling, for example. One having ordinary skill in the art will appreciate that multiple components may interoperate and modifications and variations are possible of achieving the electrical and data communication.

In some embodiments described herein, the term "coupled," "connected," and the like, may be used herein to indicate a connection, although not necessarily directly, and may include wired and/or wireless connections.

The term "network node" used herein can be any kind of network node comprised in a radio network which may further comprise any of base station (BS), radio base station, base transceiver station (BTS), base station controller (BSC), radio network controller (RNC), g Node B (gNB), evolved Node B (eNB or eNodeB), Node B, multi-standard radio (MSR) radio node such as MSR BS, multi-cell/multicast coordination entity (MCE), integrated access and backhaul (IAB) node, relay node, donor node controlling relay, radio access point (AP), transmission points, transmission nodes, Remote Radio Unit (RRU), Remote Radio Head (RRH), baseband unit (BBU), a core network node (e.g., mobile management entity (MME), self-organizing network (SON) node, a coordinating node, positioning node, MDT node, etc.), an external node (e.g., $3^{rd}$ party node, a node external to the current network), nodes in distributed antenna system (DAS), a spectrum access system (SAS) node, an element management system (EMS), etc. The network node may also comprise test equipment. The term "radio node" used herein may be used to also denote a wireless device (WD) such as a wireless device (WD) or a radio network node.

In some embodiments, the non-limiting terms wireless device (WD) or a user equipment (UE) are used interchangeably. The WD herein can be any type of wireless device capable of communicating with a network node or another WD over radio signals, such as wireless device (WD). The WD may also be a radio communication device, target device, device to device (D2D) WD, machine type WD or WD capable of machine to machine communication (M2M), low-cost and/or low-complexity WD, a sensor equipped with WD, Tablet, mobile terminals, smart phone, laptop embedded equipped (LEE), laptop mounted equipment (LME), USB dongles, Customer Premises Equipment (CPE), an Internet of Things (IoT) device, or a Narrowband IoT (NB-IoT) device, etc.

Also, in some embodiments the generic term "radio network node" is used. It can be any kind of a radio network node which may comprise any of base station, radio base station, base transceiver station, base station controller, network controller, RNC, evolved Node B (eNB), Node B, gNB, Multi-cell/multicast Coordination Entity (MCE), IAB node, relay node, access point, radio access point, Remote Radio Unit (RRU) Remote Radio Head (RRH).

In some embodiments, the term "adjusting" may be considered to indicate increasing or decreasing. In some embodiments, the term "dynamically adjusting" may be considered to indicate continuously and/or periodically adjusting as in, as a contextual example, an outerloop of an allocation control loop.

In some embodiments, the term "allocation" may be considered to refer to a WD being allocated one or more resources for a transmission, such as, for example, allocating a radio resource on a channel for a signal to be transmitted to or from the WD (e.g., time-frequency resource for SRS on a physical uplink channel).

In some embodiments, the term "radio resource" is intended to indicate a frequency resource and/or a time resource. The time resource may correspond to any type of physical resource or radio resource expressed in terms of length of time. Examples of time resources are: symbol, time slot, subframe, radio frame, transmission time interval (TTI), interleaving time, etc. The frequency resource may correspond to one or more resource elements, subcarriers, resource blocks, bandwidth part and/or any other resources in the frequency domain. The radio resource may also indicate a combination of subcarriers, time slots, codes and/or spatial dimensions.

Even though the descriptions herein may be explained in the context of one of a Downlink (DL) and an Uplink (UL) communication, it should be understood that the basic principles disclosed may also be applicable to the other of the one of the DL and the UL communication. For DL communication, the network node is the transmitter and the receiver is the WD. For the UL communication, the transmitter is the WD and the receiver is the network node.

In some embodiments, the allocated radio resource may be allocated for a particular signal and on a particular channel. Signaling may generally comprise one or more symbols and/or signals and/or messages. A signal may comprise or represent one or more bits. An indication may represent signaling, and/or be implemented as a signal, or as a plurality of signals. One or more signals may be included in and/or represented by a message. Signaling, in particular control signaling, may comprise a plurality of signals and/or messages, which may be transmitted on different carriers and/or be associated to different signaling processes, e.g. representing and/or pertaining to one or more such processes and/or corresponding information. An indication may comprise signaling, and/or a plurality of signals and/or messages and/or may be comprised therein, which may be transmitted on different carriers and/or be associated to different acknowledgement signaling processes, e.g. representing and/or pertaining to one or more such processes. Signaling associated to a channel may be transmitted such that represents signaling and/or information for that channel, and/or that the signaling is interpreted by the transmitter and/or receiver to belong to that channel. Such signaling may generally comply with transmission parameters and/or format/s for the channel.

A channel may generally be a logical, transport or physical channel. A channel may comprise and/or be arranged on one or more carriers, in particular a plurality of subcarriers.

A channel carrying and/or for carrying control signaling/control information may be considered a control channel, in particular if it is a physical layer channel and/or if it carries control plane information. Analogously, a channel carrying and/or for carrying data signaling/user information may be considered a data channel, in particular if it is a physical layer channel and/or if it carries user plane information. A channel may be defined for a specific communication direction, or for two complementary communication directions (e.g., UL and DL, or sidelink in two directions), in which case it may be considered to have at least two component channels, one for each direction. Examples of channels comprise a channel for low latency and/or high reliability transmission, in particular a channel for Ultra-Reliable Low Latency Communication (URLLC), which may be for control and/or data. In some embodiments, the channel described herein may be an uplink channel and in further embodiments may be a physical uplink shared channel (PUSCH) or a physical uplink control channel (PUCCH). In some embodiments, the channel may be a downlink channel, such as, a physical downlink control channel (PDCCH) or a physical downlink shared channel (PDSCH).

Transmitting in downlink may pertain to transmission from the network or network node to the terminal. The terminal may be considered the WD or UE. Transmitting in uplink may pertain to transmission from the terminal to the network or network node. Transmitting in sidelink may pertain to (direct) transmission from one terminal to another. Uplink, downlink and sidelink (e.g., sidelink transmission and reception) may be considered communication directions. In some variants, uplink and downlink may also be used to described wireless communication between network nodes, e.g. for wireless backhaul and/or relay communication and/or (wireless) network communication for example between base stations or similar network nodes, in particular communication terminating at such. It may be considered that backhaul and/or relay communication and/or network communication is implemented as a form of sidelink or uplink communication or similar thereto.

Note that although terminology from one particular wireless system, such as, for example, 3GPP LTE and/or New Radio (NR), may be used in this disclosure, this should not be seen as limiting the scope of the disclosure to only the aforementioned system. Other wireless systems, including without limitation Wide Band Code Division Multiple Access (WCDMA), Worldwide Interoperability for Microwave Access (WiMax), Ultra Mobile Broadband (UMB) and Global System for Mobile Communications (GSM), may also benefit from exploiting the ideas covered within this disclosure.

Note further, that functions described herein as being performed by a wireless device or a network node may be distributed over a plurality of wireless devices and/or network nodes. In other words, it is contemplated that the functions of the network node and wireless device described herein are not limited to performance by a single physical device and, in fact, can be distributed among several physical devices.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Referring now to the drawing figures, in which like elements are referred to by like reference numerals, there is shown in FIG. 1 a schematic diagram of a communication system 10, according to an embodiment, such as a 3GPP-type cellular network that may support standards such as LTE and/or NR (5G), which comprises an access network 12, such as a radio access network, and a core network 14. The access network 12 comprises a plurality of network nodes 16a, 16b, 16c (referred to collectively as network nodes 16), such as NBs, eNBs, gNBs or other types of wireless access points, each defining a corresponding coverage area 18a, 18b, 18c (referred to collectively as coverage areas 18). Each network node 16a, 16b, 16c is connectable to the core network 14 over a wired or wireless connection 20. A first wireless device (WD) 22a located in coverage area 18a is configured to wirelessly connect to, or be paged by, the corresponding network node 16a. A second WD 22b in coverage area 18b is wirelessly connectable to the corresponding network node 16b. While a plurality of WDs 22a, 22b (collectively referred to as wireless devices 22) are illustrated in this example, the disclosed embodiments are equally applicable to a situation where a sole WD is in the coverage area or where a sole WD is connecting to the corresponding network node 16. Note that although only two WDs 22 and three network nodes 16 are shown for convenience, the communication system may include many more WDs 22 and network nodes 16.

Also, it is contemplated that a WD 22 can be in simultaneous communication and/or configured to separately communicate with more than one network node 16 and more than one type of network node 16. For example, a WD 22 can have dual connectivity with a network node 16 that supports LTE and the same or a different network node 16 that supports NR. As an example, WD 22 can be in communication with an eNB for LTE/E-UTRAN and a gNB for NR/NG-RAN.

The connection 26 may extend directly from the access network 12 and/or core network 14 or may extend via an optional intermediate network 28. The intermediate network 28 may be one of, or a combination of more than one of, a public, private or hosted network. The intermediate network 28, if any, may be a backbone network or the Internet. In some embodiments, the intermediate network 28 may comprise two or more sub-networks (not shown).

A network node 16 is configured to include an adjustment unit 30 which is configured to cause the network node to adjust a periodicity of periodic resources allocated to a WD in a wireless network.

Example implementations, in accordance with an embodiment, of the WD 22 and network node 16 discussed in the preceding paragraphs will now be described with reference to FIG. 2.

The communication system 10 further includes a network node 16 provided in a communication system 10 and including hardware 32 enabling it to communicate with the WD 22. The hardware 32 may include a communication interface 34 for setting up and maintaining a wired or wireless connection with an interface of a different communication device of the communication system 10, as well as a radio interface 36 for setting up and maintaining at least a wireless connection 60 with a WD 22 located in a coverage area 18 served by the network node 16. The radio interface 36 may be formed as or may include, for example, one or more radio frequency (RF) transmitters, one or more RF receivers, and/or one or more RF transceivers.

In the embodiment shown, the hardware 32 of the network node 16 further includes processing circuitry 38. The processing circuitry 38 may include a processor 40 and a memory 42. In particular, in addition to or instead of a processor, such as a central processing unit, and memory, the processing circuitry 38 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 40 may be configured to access (e.g., write to and/or read from) the memory 42, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the network node 16 further has software 44 stored internally in, for example, memory 42, or stored in external memory (e.g., database, storage array, network storage device, etc.) accessible by the network node 16 via an external connection. The software 44 may be executable by the processing circuitry 38. The processing circuitry 38 may be configured to control any of the methods and/or processes described herein and/or to cause such methods, and/or processes to be performed, e.g., by network node 16. Processor 40 corresponds to one or more processors 40 for performing network node 16 functions described herein. The memory 42 is configured to store data, programmatic software code and/or other information described herein. In some embodiments, the software 44 may include instructions that, when executed by the processor 40 and/or processing circuitry 38, causes the processor 40 and/or processing circuitry 38 to perform the processes described herein with respect to network node 16. For example, processing circuitry 38 of the network node 16 may include adjustment unit 30 configured to perform network node methods discussed herein, such as the methods discussed with reference to FIG. 3 as well as other figures.

The communication system 10 further includes the WD 22 already referred to. The WD 22 may have hardware 46 that may include a radio interface 48 configured to set up and maintain a wireless connection 60 with a network node 16 serving a coverage area 18 in which the WD 22 is currently located. The radio interface 48 may be formed as or may include, for example, one or more RF transmitters, one or more RF receivers, and/or one or more RF transceivers.

The hardware 46 of the WD 22 further includes processing circuitry 50. The processing circuitry 50 may include a processor 52 and memory 54. In particular, in addition to or instead of a processor, such as a central processing unit, and memory, the processing circuitry 50 may comprise integrated circuitry for processing and/or control, e.g., one or more processors and/or processor cores and/or FPGAs (Field Programmable Gate Array) and/or ASICs (Application Specific Integrated Circuitry) adapted to execute instructions. The processor 52 may be configured to access (e.g., write to and/or read from) memory 54, which may comprise any kind of volatile and/or nonvolatile memory, e.g., cache and/or buffer memory and/or RAM (Random Access Memory) and/or ROM (Read-Only Memory) and/or optical memory and/or EPROM (Erasable Programmable Read-Only Memory).

Thus, the WD 22 may further comprise software 56, which is stored in, for example, memory 54 at the WD 22, or stored in external memory (e.g., database, storage array, network storage device, etc.) accessible by the WD 22. The software 56 may be executable by the processing circuitry 50. The software 56 may include a client application 58. The client application 58 may be operable to provide a service to a human or non-human user via the WD 22. The client application 58 may interact with the user to generate the user data that it provides.

The processing circuitry 50 may be configured to control any of the methods and/or processes described herein and/or to cause such methods, and/or processes to be performed, e.g., by WD 22. The processor 52 corresponds to one or more processors 52 for performing WD 22 functions described herein. The WD 22 includes memory 54 that is configured to store data, programmatic software code and/or other information described herein. In some embodiments, the software 56 and/or the client application 58 may include instructions that, when executed by the processor 52 and/or processing circuitry 50, causes the processor 52 and/or processing circuitry 50 to perform the processes described herein with respect to WD 22. For example, the processing circuitry 50 of the wireless device 22 may be configured to use resources and/or receive and/or transmit on radio resources (e.g., physical layer resources, such as, physical downlink control channel, physical downlink shared channel, physical uplink control channel and/or physical uplink shared channel, etc.) that are allocated to the WD 22 using one or more of the techniques disclosed herein.

Figure 2:
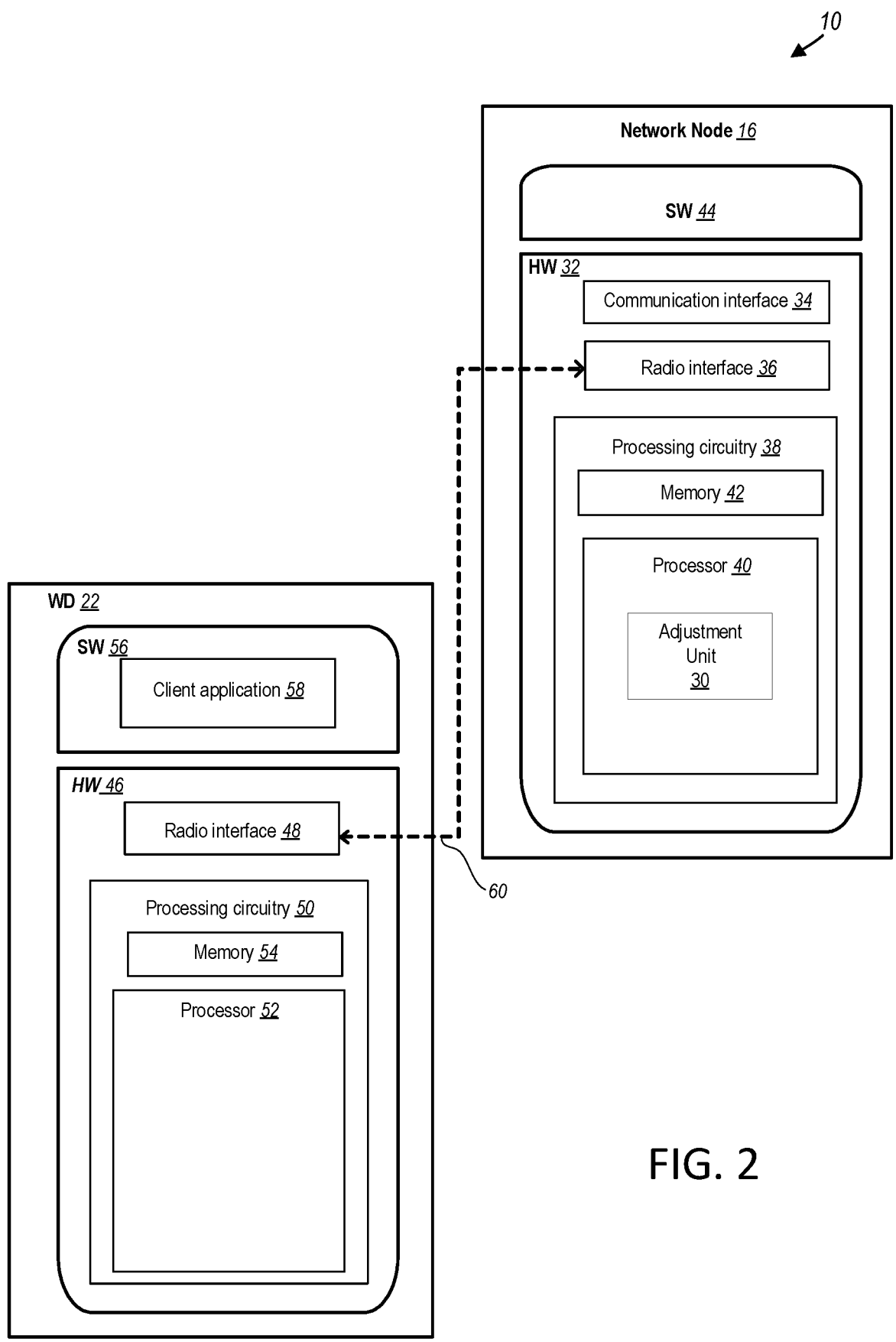
FIG. 2 is a block diagram of a network node in communication with a wireless device over an at least partially wireless connection according to some embodiments of the present disclosure.

In some embodiments, the inner workings of the network node 16 and WD 22, may be as shown in FIG. 2 and independently, the surrounding network topology may be that of FIG. 1.

Although FIGS. 1 and 2 show various "units" such as adjustment unit 30 as being within a processor, it is contemplated that these units may be implemented such that a portion of the unit is stored in a corresponding memory within the processing circuitry. In other words, the units may be implemented in hardware or in a combination of hardware and software within the processing circuitry.

In addition, although FIGS. 1 and 2 show adjustment unit 30 as being with the network node 16, it is contemplated that the network node 16 may include only one of these units.

Figure 3:
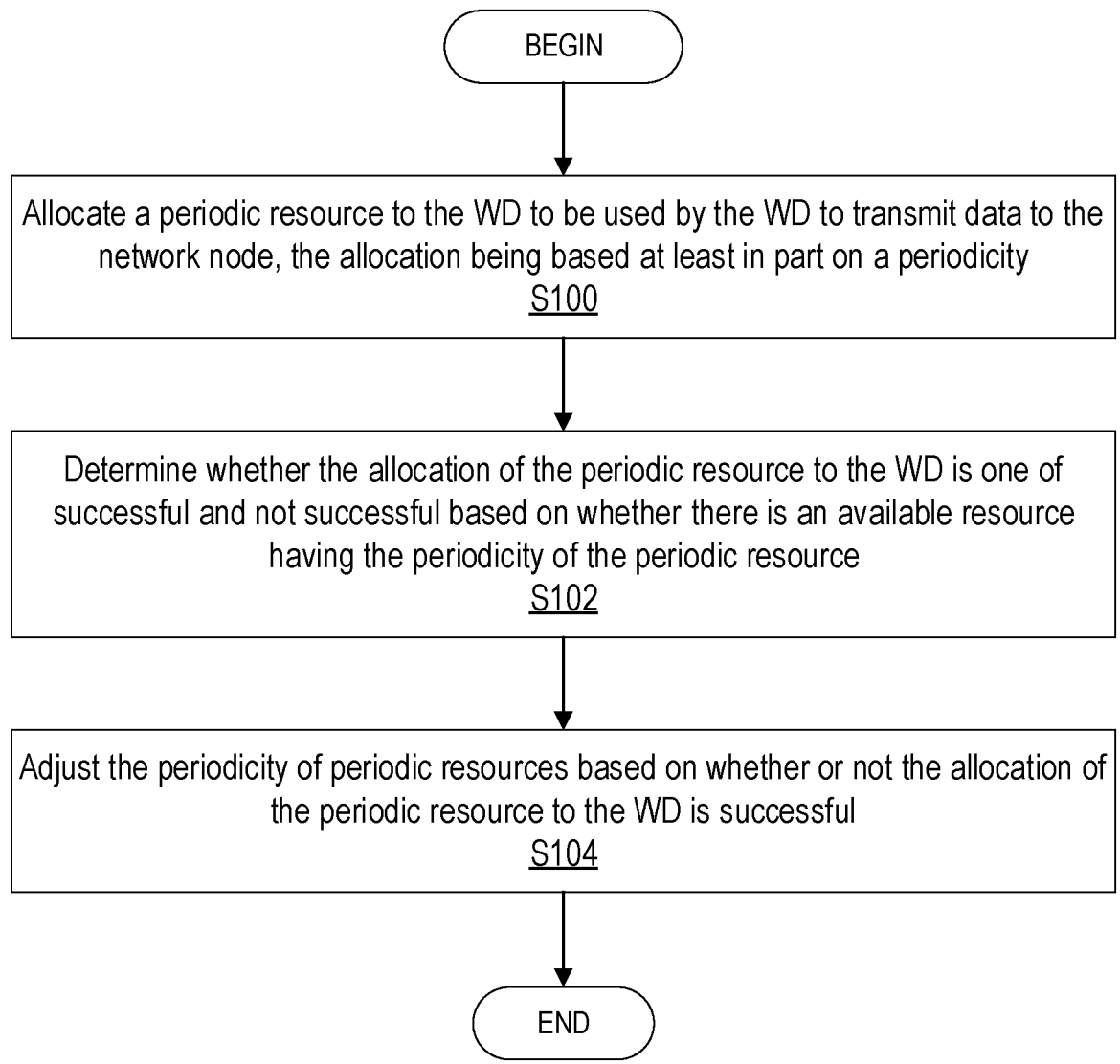
FIG. 3 is a flowchart of an example method for adjusting a periodicity of periodic resources allocated to a WD in a wireless network according to one embodiment of the present disclosure.

FIG. 3 is a flowchart of an example process in a network node 16 for method for a network node (16) for adjusting a periodicity of periodic resources allocated to a WD 22 in a wireless network according to some embodiments of the present disclosure. One or more Blocks and/or functions and/or methods performed by the network node 16 may be performed by one or more elements of network node 16 such as via adjustment unit 30 in processing circuitry 38, processor 40, communication interface 34, radio interface 36, etc. according to the example method. The example method includes allocating (Block S100), such as via adjustment unit 30, processing circuitry 38, processor 40, communication interface 34 and/or radio interface 36, a periodic resource to the WD 22 to be used by the WD 22 to transmit data to the network node 16, the allocation being based at least in part on a periodicity. The method includes determining (Block S102), such as via adjustment unit 30, processing circuitry 38, processor 40, communication interface 34 and/or radio interface 36, whether the allocation of the periodic resource to the WD 22 is one of successful and not successful based on whether there is an available resource having the periodicity of the periodic resource. In addition, the example method includes adjusting (Block S104), such as via adjustment unit 30, processing circuitry 38, processor 40, communication interface 34 and/or radio interface 36, the periodicity of periodic resources based on whether or not the allocation of the periodic resource to the WD 22 is successful.

In some embodiments of this aspect, adjusting the periodicity is further based on an output generated, such as via adjustment unit 30, processing circuitry 38, processor 40, communication interface 34 and/or radio interface 36, by one of an integral controller and proportional-integral-derivative (PID) controller. In other embodiments of this aspect, adjusting the periodicity further includes determining, such as via adjustment unit 30, processing circuitry 38, processor 40, communication interface 34 and/or radio interface 36, upStep as an amount of increase in the periodicity, given by $$upStep = \frac{1 - maxBlockProb}{maxBlockProb} \times downStep,$$

where downStep is a configurable parameter denoting an amount of decrease in periodicity, and maxBlockProb is a configurable parameter that denotes a maximum blocking probability of the WD 22 requiring an unavailable periodic resource.

In some embodiments of this aspect, adjusting the periodicity further includes decrementing, such as via adjustment unit 30, processing circuitry 38, processor 40, communication interface 34 and/or radio interface 36, the periodicity by an amount equal to downStep if the allocation of the periodic resource to the WD 22 is successful, and incrementing, such as via adjustment unit 30, processing circuitry 38, processor 40, communication interface 34 and/or radio interface 36, the periodicity by an amount equal to upStep if the allocation of the periodic resource to the WD 22 is not successful. In some embodiments of this aspect, adjusting the periodicity is further based on a type of periodic resource being allocated by the network node 16.

In some embodiments of this aspect, adjusting the periodicity further includes updating, such as via adjustment unit 30, processing circuitry 38, processor 40, communication interface 34 and/or radio interface 36, the periodicity so that the periodicity is within a configurable range. In other embodiments of this aspect, adjusting the periodicity is further based on one of a plurality of predefined classes of WD 22 users.

In some embodiments of this aspect, the method further includes determining, such as via adjustment unit 30, processing circuitry 38, processor 40, communication interface 34 and/or radio interface 36, that periodic resources are unavailable to be allocated to the WD 22. A plurality of WD 22s having allocated periodic resources is identified, such as via adjustment unit 30, processing circuitry 38, processor 40, communication interface 34 and/or radio interface 36. A periodicity is obtained, such as via adjustment unit 30, processing circuitry 38, processor 40, communication interface 34 and/or radio interface 36, for each of the identified WDs 22 of the plurality of WDs 22 to determine, such as via adjustment unit 30, processing circuitry 38, processor 40, communication interface 34 and/or radio interface 36, a new periodicity, $p_{new}$, to be assigned, such as via adjustment unit 30, processing circuitry 38, processor 40, communication interface 34 and/or radio interface 36, to the WD 22 and each of the identified WDs 22, $p_{new}$ being expressed as:

$$p_{new} = f\left(\frac{n+1}{\sum_{i=1}^{n} \frac{1}{p_i}}\right),$$

where f is a function that rounds up to a next supported periodicity, n is a total number of identified WDs 22 with allocated periodic resources, i is an index of summation for an identified WDs 22 of the identified WDs 22, and $p_i$ is the periodicity of the identified WD 22. The method further includes, optionally, assigning, such as via adjustment unit 30, processing circuitry 38, processor 40, communication interface 34 and/or radio interface 36, periodicity, $p_{new}$, to the WD 22 and each of the identified WDs 22.

In some embodiments of this aspect, identifying a WD 22 for inclusion in the plurality of WDs 22 is based at least in part on predefined criteria including one of a priority of the WD 22, an activity of a WD 22 on the wireless network, periodicity of a WD 22, and a periodicity benefit of the WD 22. In some other embodiments of this aspect, allocating a periodic resource is initiated, such as via adjustment unit 30, processing circuitry 38, processor 40, communication interface 34 and/or radio interface 36, when a need to allocate the periodic resource to the WD 22 is determined. In some embodiments, the periodic resource is one of a physical uplink control channel, PUCCH, scheduling request, SR, resource, a PUCCH channel quality indicator, CQI, resource, and a periodic sounding reference signal (SRS), the periodic resource being used in one of Long Term Evolution, LTE, and New Radio, NR.

Having described the general process flow of arrangements of the disclosure and having provided examples of hardware and software arrangements for implementing the processes and functions of the disclosure, the sections below provide details and examples of arrangements for adjusting a periodicity of periodic resources allocated to a WD 22, which may be implemented by the network node 16 and/or wireless device 22. Some embodiments provide one or more techniques for adjusting a periodicity of periodic resources allocated to one or more WDs 22.

Some embodiments provide a load-aware control arrangement, which dynamically adjusts the periodicity of a pool of periodic resources at a cell level. In some embodiments, periodicity is dynamically adjusted such that a blocking probability, defined as the probability of a WD 22 requiring a periodic resource when there is no resource available, is below a pre-configured threshold. A WD 22 may need the resource when the WD 22 first connects to a network node 16, and the network node 16 needs to assign a WD 22 such a resource. In some embodiments, the WD 22 may need a resource when the WD 22 moves from an out-of-sync status to an in-sync status. Other events can also trigger the determination of whether the network node 16 will allocate or deallocate a resource to the WD 22, such as handover, change of WD's requirements or channel conditions, change of user transmission mode, or any other trigger. The present disclosure herein is independent of triggers, i.e., may work equally well with any triggers.

An example of a method that adapts periodicity is described below:

Method parameters:
  maxBlockProb: configurable parameter that denotes the maximum blocking probability that a WD 22 requiring a periodic resource when there is no resource available
  downStep: a configurable parameter denoting the amount of decrease in periodicity
  upStep: the amount of increase in periodicity given by $$upStep = \frac{1 - maxBlockProb}{maxBlockProb} \times downStep, \quad (1)$$

maxPeriodicity: a configurable parameter denoting maximum periodicity minPeriodicity: a configurable parameter denoting minimum periodicity Output: period Internal state: period Execution:
    When a WD 22 requires a resource
        If the resource is allocated successfully:
            period:=period−downStep
        Else (i.e., the WD cannot be allocated a resource),
            period:=period+upStep
        period:=min (max (period, minPeriod), maxPeriod)
    Return: period (the caller of this algorithm may use a quantized version of period according to supported periodicities)

The above method, which may be performed by a network node 16, updates the period when a user is to be allocated a periodic resource, whether the allocation is successful or not. In the long-term, for sufficiently small value of down-Step and achievable maxBlockProb, the method will result in a blocking probability that is less than or equal to maxBlockProb. The method above may employ an integral controller due to the simplicity and efficacy of such controller. More advanced controllers may be readily used in the method above in a straightforward manner, such as a proportional-integral-derivative (PID) controller. Intuitively, when no resource is available, periodicity increases to make room for more resources. This way, more users will be allocated resources in upcoming allocations. Conversely, when there is at least one available resource, periodicity decreases to improve performance as resources are available. In the long-term, the algorithm above finds a setting of the periodicity that achieves a compromise between performance and the number of available resources while satisfying maxBlockProb.

A value of parameter maxBlockProb may be chosen to strike a balance between a gain achieved by using lower periodicities and a block probability. Low values of maxBlockProb imply less blocking but also less gain from lower periodicities, and vice versa. The value of maxBlockProb also depends on the importance of the resource to be allocated. For instance, giving every WD 22 an SR resource may be of utmost importance. To give every WD 22 an SR resource, maxBlockProb may be set to a very low value (<1%), since a user's uplink traffic may be carried without an SR resource by employing at least one of semi-persistence scheduling, UL prescheduling, or random access procedure, all of which may be expensive. On the other hand, SRS resources are used more often for performance improvement. Therefore, SRS resources may be considered to have less importance compared to SR resources, and maxBlockProb may be set to a higher value than the maxBlockProb value used for SR resources. In some embodiments, the method described above may be applied separately for each type of resource.

In some embodiments, a network node 16, e.g., a base-station, may classify users in multiple M priority classes (e.g., based on user subscription package) and apply the method described above M times for each set of user class, where each run of the method may have corresponding parameter settings of maxBlockProb and downStep. For example, a higher priority WD 22 set may have a lower value of maxBlockProb compared to the maxBlockProb value of lower priority WD 22 set.

In some embodiments, a network node 16, e.g., a base-station, may classify users in multiple M classes according to channel conditions (e.g., based on user reported CQI) and apply the method described above M times for each set of user class, where each run of the method may have corresponding parameter settings of maxBlockProb and downStep, and the method runs for the respective user priority class corresponding to the method. For example, a WD 22 in a cell-edge set may have a lower maxBlockProb value compared to the maxBlockProb value of a WD 22 in cell-center, or vice versa.

In some embodiments, when a user (Ua) of a WD 22 is to be allocated a periodic resource, but no periodic resource is available, the network node 16 may remove a resource with periodicity p from another user (Ub) of another WD 22, and then divide the removed resource into two resources, each with a periodicity of 2p. This way, both WDs 22 of users Ua and Ub get a resource of periodicity of 2p. This resource division procedure may be executed after the method described above is executed. As a result of resource division, more WDs 22 may be assigned resources at the expense of more RRC reconfiguration messages.

In yet another embodiment, when a WD 22 of user (Ua) is to be allocated a periodic resource, but no periodic resource is available, the network node 16 may remove resources with periodicities $p\_1, p\_2, \ldots, p\_n$ from n WDs 22. Then, the network node 16 may divide the n resources to n+1 resources, each with a periodicity of $p_{new}$, and assign each of the n+1 WDs 22 a resource with $p_{new}$. The expression to calculate $p_{new}$ is given by:

$$p_{new} = f\left(\frac{n+1}{\sum_{i=1}^{n}\frac{1}{p_i}}\right),$$

where f(x) is a ceiling function, which rounds x up to the next supported periodicity. Other methods for dividing the n resources to n+1 resources with different periodicities are also applicable to this disclosure.

In another embodiment, the network node 16, e.g., base-station, may select n users according to one of the following criteria: n WDs 22 with lowest priorities, n WDs 22 which are being least active before user (Ua) of WD 22 is to be allocated, n WDs 22 having resources with lowest periodicities, or n WDs 22 whom the network node 16, e.g., base-station, determines at least a benefit received from lower periodicity, where the determination may be based on WD 22 channel conditions and download/upload traffic volumes. The present disclosure is applicable to any criterion used by the network node 16, e.g., the base-station, to select the n WDs 22 in the previous embodiment.

As will be appreciated by one of skill in the art, the concepts described herein may be embodied as a method, data processing system, and/or computer program product. Accordingly, the concepts described herein may take the form of an entirely hardware embodiment, an entirely software embodiment or an embodiment combining software and hardware aspects all generally referred to herein as a "circuit" or "module." Furthermore, the disclosure may take the form of a computer program product on a tangible computer usable storage medium having computer program code embodied in the medium that can be executed by a computer. Any suitable tangible computer readable medium may be utilized including hard disks, CD-ROMs, electronic storage devices, optical storage devices, or magnetic storage devices.

Some embodiments are described herein with reference to flowchart illustrations and/or block diagrams of methods, systems and computer program products. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable memory or storage medium that can direct a computer or other programmable data processing apparatus to function in a particular manner, such that the instructions stored in the computer readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks. It is to be understood that the functions/acts noted in the blocks may occur out of the order noted in the operational illustrations. For example, two blocks shown in succession may in fact be executed substantially concurrently or the blocks may sometimes be executed in the reverse order, depending upon the functionality/acts involved. Although some of the diagrams include arrows on communication paths to show a primary direction of communication, it is to be understood that communication may occur in the opposite direction to the depicted arrows.

Computer program code for carrying out operations of the concepts described herein may be written in an object oriented programming language such as Java® or C++. However, the computer program code for carrying out operations of the disclosure may also be written in conventional procedural programming languages, such as the "C" programming language. The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

It will be appreciated by persons skilled in the art that the embodiments described herein are not limited to what has been particularly shown and described herein above. In addition, unless mention was made above to the contrary, it should be noted that all of the accompanying drawings are not to scale. A variety of modifications and variations are possible in light of the above teachings without departing from the scope of the following claims.

What is claimed is:

1. A method for a network node for adjusting a periodicity of periodic resources allocated to a wireless device, WD, in a wireless network, the periodicity defining a period of time between periodic resources allocated to the WD, the method comprising:
   allocating a periodic resource to the WD to be used by the WD to transmit data to the network node, the allocation being based at least in part on a periodicity;
   determining whether the allocation of the periodic resource to the WD is one of successful and not successful based on whether there is an available resource having the periodicity of the periodic resource; and
   adjusting the periodicity of periodic resources based on whether or not the allocation of the periodic resource to the WD is successful.

2. The method of claim 1, wherein adjusting the periodicity is further based on an output generated by one of an integral controller and proportional-integral-derivative controller.

3. The method of claim 1, wherein adjusting the periodicity further comprises:
   determining upStep as an amount of increase in the periodicity, given by $$upStep = \frac{1 - maxBlockProb}{maxBlockProb} \times downStep,$$

downStep being a configurable parameter denoting an amount of decrease in periodicity, maxBlockProb being a configurable parameter that denotes a maximum blocking probability of the WD requiring an unavailable periodic resource.

4. The method of claim 3, wherein adjusting the periodicity further comprises:
   decrementing the periodicity by an amount equal to downStep if the allocation of the periodic resource to the WD is successful; and
   incrementing the periodicity by an amount equal to upStep if the allocation of the periodic resource to the WD is not successful.

5. The method of claim 1, wherein adjusting the periodicity is further based on a type of periodic resource being allocated by the network node.

6. The method of claim 1, wherein adjusting the periodicity further comprises:
   updating the periodicity so that the periodicity is within a configurable range.

7. The method of claim 1, wherein adjusting the periodicity is further based on one of a plurality of predefined classes of WD users.

8. The method of claim 1 further comprising:
   determining that periodic resources are unavailable to be allocated to the WD;
   identifying a plurality of WDs having allocated periodic resources;
   obtaining a periodicity for each of the identified WDs of the plurality of WDs to determine a new periodicity, $p_{new}$, to be assigned to the WD and each of the identified WDs, $p_{new}$ being expressed as:

$$p_{new} = f\left(\frac{n+1}{\sum_{i=1}^{n} \frac{1}{p_i}}\right),$$

f being a function that rounds up to a next supported periodicity, n being a total number of identified WDs with allocated periodic resources, i being an index of summation for an identified WDs of the identified WDs, $p_i$ being the periodicity of the identified WD; and assigning periodicity, $p_{new}$, to the WD and each of the identified WDs.

9. The method of claim 8, wherein identifying a WD for inclusion in the plurality of WDs is based at least in part on predefined criteria including one of a priority of the WD, an activity of a WD on the wireless network, periodicity of a WD, and a periodicity benefit of the WD.

10. The method of claim 1, wherein allocating a periodic resource is initiated when a need to allocate the periodic resource to the WD is determined.

11. The method of claim 1, wherein the periodic resource is one of a physical uplink control channel, PUCCH, scheduling request, SR, resource, a PUCCH channel quality indicator, CQI, resource, and a periodic sounding reference signal, SRS, the periodic resource being used in one of Long Term Evolution, LTE, and New Radio, NR.

12. A network node configured to adjust a periodicity of periodic resources allocated to a wireless device, WD, in a wireless network, the periodicity defining a period of time between periodic resources allocated to the WD, the network node comprising:
   processing circuitry, the processing circuitry having a processor and a memory, the processing circuitry configured to:
      allocate a periodic resource to the WD to be used by the WD to transmit data to the network node, the allocation being based at least in part on a periodicity;
      determine whether the allocation of the periodic resource to the WD is one of successful and not successful based on whether there is an available resource having the periodicity of the periodic resource; and
      adjust the periodicity of periodic resources based on whether or not the allocation of the periodic resource to the WD is successful.

13. The network node of claim 12, wherein adjusting the periodicity is further based on an output generated by one of an integral controller and proportional-integral-derivative controller.

14. The network node of claim 12, wherein adjusting the periodicity further comprises:
   determining upStep as an amount of increase in the periodicity, given by $$upStep = \frac{1 - maxBlockProb}{maxBlockProb} \times downStep,$$

downStep being a configurable parameter denoting an amount of decrease in periodicity, maxBlockProb being a configurable parameter that denotes a maximum blocking probability of the WD requiring an unavailable periodic resource.

15. The network node of claim 14, wherein adjusting the periodicity further comprises:
   decrementing the periodicity by an amount equal to downStep if the allocation of the periodic resource to the WD is successful; and
   incrementing the periodicity by an amount equal to upStep if the allocation of the periodic resource to the WD is not successful.

16. The network node of claim 12, wherein adjusting the periodicity is further based on a type of periodic resource being allocated by the network node.

17. The network node of claim 12, wherein adjusting the periodicity further comprises:
   updating the periodicity so that the periodicity is within a configurable range.

18. The network node of claim 12, wherein adjusting the periodicity is further based on one of a plurality of predefined classes of WD users.

19. The network node of claim 12, wherein the processing circuitry is further configured to:
   determine that periodic resources are unavailable to be allocated to the WD;
   identify a plurality of WDs having allocated periodic resources;
   obtain a periodicity for each of the identified WDs of the plurality of WDs to determine a new periodicity, $p_{new}$, to be assigned to the WD and each of the identified WDs, $p_{new}$ being expressed as:

$$p_{new} = f\left(\frac{n+1}{\sum_{i=1}^{n} \frac{1}{p_i}}\right),$$

f being a function that rounds up to a next supported periodicity, n being a total number of identified WDs with allocated periodic resources, i being an index of summation for an identified WDs of the identified WDs, $p_i$ being the periodicity of the identified WD; and
   assign periodicity, $p_{new}$, to the WD and each of the identified WDs.

20. The network node of claim 19, wherein identifying a WD for inclusion in the plurality of WDs is based at least in part on predefined criteria including one of a priority of the WD, an activity of a WD on the wireless network, periodicity of a WD, and a periodicity benefit of the WD.

21. The network node of claim 12, wherein allocating a periodic resource is initiated when a need to allocate the periodic resource to the WD is determined.

22. The network node of claim 12, wherein the periodic resource is one of a physical uplink control channel, PUCCH, scheduling request, SR, resource, a PUCCH channel quality indicator, CQI, resource, and a periodic sounding reference signal, SRS, the periodic resource being usable in one of Long Term Evolution, LTE, and New Radio, NR.

* * * * *